(12) United States Patent
Azevedo et al.

(10) Patent No.: US 7,073,030 B2
(45) Date of Patent: Jul. 4, 2006

(54) METHOD AND APPARATUS PROVIDING NON LEVEL ONE INFORMATION CACHING USING PREFETCH TO INCREASE A HIT RATIO

(75) Inventors: Michael Joseph Azevedo, San Jose, CA (US); Carol Spanel, San Jose, CA (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 10/153,966

(22) Filed: May 22, 2002

(65) Prior Publication Data

US 2003/0221069 A1 Nov. 27, 2003

(51) Int. Cl.
*G06F 12/00* (2006.01)

(52) U.S. Cl. .................. 711/136; 711/134; 711/137; 711/141; 711/144; 711/145; 711/146; 711/160

(58) Field of Classification Search .............. 711/136
See application file for complete search history.

(56) References Cited

U.S. PATENT DOCUMENTS

| | | |
|---|---|---|
| 5,781,922 A | 7/1998 | Braceras et al. |
| 5,787,469 A | 7/1998 | Merrell |
| 5,805,855 A | 9/1998 | Liu |
| 5,815,700 A | 9/1998 | Poplingher et al. |
| 5,826,052 A | 10/1998 | Stiles et al. |
| 5,829,027 A | 10/1998 | Goodrum |
| 5,835,946 A | 11/1998 | Allen et al. |
| 5,875,462 A | 2/1999 | Bauman et al. |
| 5,875,470 A | 2/1999 | Dreibelbis et al. |
| 5,893,163 A | 4/1999 | Arimilli et al. |
| 5,903,908 A | 5/1999 | Singh et al. |
| 5,909,694 A | 6/1999 | Gregor et al. |
| 5,918,246 A | 6/1999 | Goodnow et al. |
| 5,956,477 A | 9/1999 | Ranson et al. |
| 6,038,642 A | 3/2000 | Arimilli et al. |
| 6,044,437 A | 3/2000 | Reinders |
| 6,047,358 A * | 4/2000 | Jacobs ........................ 711/133 |
| 6,081,872 A | 6/2000 | Matick et al. |
| 6,092,186 A | 7/2000 | Betker et al. |
| 6,098,154 A * | 8/2000 | Lopez-Aguado et al. ... 711/137 |

(Continued)

FOREIGN PATENT DOCUMENTS

EP 0 404 126 6/1990

(Continued)

OTHER PUBLICATIONS

"Controlling of Microprocessor's Internal And External Cache Memory," IBM Technical Disclosure Bulletin, No. 8B, Jan. 1990, 3 pages, http://www.delphion.com/tdbs/tdb?&order=90A+60276.

*Primary Examiner*—Pierre Vital
*Assistant Examiner*—Midys Rojas
(74) *Attorney, Agent, or Firm*—Chambliss, Bahner & Stophel; David Lynch

(57) ABSTRACT

A method and apparatus for increasing the processing speed of processors and increasing the data hit ratio is disclosed herein. The method increases the processing speed by providing a non-L1 instruction caching that uses prefetch to increase the hit ratio. Cache lines in a cache set are buffered, wherein the cache lines have a parameter indicating data selection characteristics associated with each buffered cache line. Then which buffered cache lines to cast out and/or invalidate is determined based upon the parameter indicating data selection characteristics.

20 Claims, 10 Drawing Sheets

U.S. PATENT DOCUMENTS

| | | |
|---|---|---|
| 6,101,578 A | 8/2000 | Patwardhan et al. |
| 6,105,111 A | 8/2000 | Hammarlund et al. |
| 6,115,795 A | 9/2000 | Gilda et al. |
| 6,119,222 A | 9/2000 | Shiell et al. |
| 6,157,986 A | 12/2000 | Witt |
| 6,161,166 A | 12/2000 | Doing et al. |
| 6,175,906 B1 | 1/2001 | Christie |
| 6,192,451 B1 | 2/2001 | Arimilli et al. |
| 6,202,125 B1 | 3/2001 | Patterson et al. |
| 6,202,129 B1 | 3/2001 | Palanca et al. |
| 6,212,629 B1 | 4/2001 | McFarland et al. |
| 6,446,167 B1 | 9/2002 | Mayfield et al. |
| 6,601,144 B1 * | 7/2003 | Arimilli et al. ............ 711/146 |

FOREIGN PATENT DOCUMENTS

| | | |
|---|---|---|
| JP | 05334082 | 6/1992 |
| JP | 05088960 | 4/1993 |
| JP | 08016390 | 1/1996 |
| JP | 08036525 | 2/1996 |
| JP | 11003280 | 1/1999 |
| JP | 11259300 | 9/1999 |
| JP | 11272559 | 10/1999 |
| JP | 11316750 | 11/1999 |
| KR | 1999-0070179 | 9/1999 |

* cited by examiner

| Access Type | CPU Cycles | Time (ns) |
|---|---|---|
| L1 Access | 1 | 2 |
| L2 Access | 5 | 10 |
| Main Memory Access | ~75 | 150 |

METHOD AND APPARATUS PROVIDING NON LEVEL ONE INFORMATION CACHING USING PREFETCH TO INCREASE A HIT RATIO

CROSS-REFERENCE TO RELATED APPLICATION

This application is related to the following and commonly-assigned U.S. patent application, which is hereby incorporated herein by reference in their respective entirety:

"A METHOD AND APPARATUS FOR INCREASING PROCESSOR PERFORMANCE IN A COMPUTING SYSTEM" to Walls et al., having U.S. patent application Ser. No. 10/154,380.

BACKGROUND OF THE INVENTION

1. Field of the Invention.

This invention relates in general to processor caching methods, and more particularly to a method and apparatus for increasing processing speed in a computing system by optimizing the hit ratio of requests from requesting devices by providing the processor with a non level one (L1) information cache that prefetches information stored therein to increase the hit ratio.

2. Description of Related Art

There has been a dramatic increase in the amount and type of data that computing systems are processing of late. Computing systems routinely process two dimensional and three dimensional images, graphics, audio and video media. Networking has allowed information to be shared throughout the world and consumers demand seamless access to data and a high level of performance of media containing vast quantities of data. Thus, computing systems are being required to perform more demanding tasks to satiate consumer's media hunger.

In order to increase performance, processors may be provided with embedded caches to store data logically and physically closer to the processor. An embedded cache operates at the processor frequency and therefore allows access to information, such as instructions or data, more quickly than external caches.

Many computing systems like storage controllers, routers and servers use processors to control various hardware components. The processors run real time operating systems, handle interrupts, set up direct memory access transfers, check control information for validity, translate addresses and perform other functions. Because these functions are in the critical functional path, the overall performance of these routines is greatly influenced by processing speed.

Numerous major factors contribute to processing speed. One such factor is the core operating frequency of the processor. Another factor is the amount and type of level 1 (L1) data and instruction caches resident on the processor. Caches are classified by the level they occupy in the memory hierarchy. Early computers employed a single, multichip cache that occupied one level of the hierarchy between the processor and the main memory. Two developments made it desirable to introduce two or more cache levels in a high performance system: the feasibility of including part of the real memory space on a microprocessor chip and growth in the size of main memory in computers. A level one (L1) or primary cache is an efficient way to implement an on-chip memory.

An additional factor influencing processor speed is the amount and type of level 2 (L2) caches present, if any. An additional memory level can be introduced via either on-chip or off-chip level two (L2) secondary cache. The desirability of an L2 cache increases with the size of main memory. As main memory size increases further, even more cache levels may be desirable. The L1 cache is higher in the cache hierarchy than the L2 cache. The L1 cache contains less information than the L2 cache and all the data and/or instructions that are stored on the L1 cache are also stored on the L2 cache.

The type and stages of the data transfer pipeline within the processor is another important factor affecting processing speed. Another important factor contributing to processor speed is the number of instructions which can be executed simultaneously by the processor.

Effective cache subsystems will desirably provide instruction and data availability with minimum latency. A processor or another information requesting device requests a specific access (piece of information or data). If the access is immediately available in the cache, the request is considered a hit. However, if the access is not already present and available in the cache, this is considered a miss.

By way of definition, a hit ratio is a measure of the probability that an access will be resident in a particular cache. High hit ratios result in lower processing times for similar units of work. That is, if L1 caches run at processor speeds and have the capacity to contain the entire code load, including all necessary peripheral data and instructions, then the resulting processing time would be the smallest time possible. The processor would then be operating at maximum or peak performance.

However, the reality is that modern code loads for complex programs and systems are very large, often many megabytes. Therefore, it is impractical to provide processors with embedded L1 caches having such large capacities. For example, practical constraints have limited L1 caches in processors to 32K bytes or less in most cases. A split L1 cache contains both a 32K data cache and a 32K instruction cache. Instruction hit ratios using economically feasible L1 capacities currently available have tended to be disappointingly low. The probability that the first access to a cache line is a hit is very low. Once the cache line is fetched, then there may be up to N consecutive hits, where N represents the average number of sequential instructions processed before a taken branch is executed.

To overcome this disadvantage, processors having embedded L2 caches, in addition to the smaller capacity embedded L1 caches disposed therein and which run at processor speed, are desirable. Processors having embedded L2 caches running at processor speeds provide significant increases in performance while meeting requirements for cost, power and space. Bearing the power, cost and space requirements in mind, an L2 cache having 256K to 512K bytes of memory can be placed on a processor. Unfortunately, many L2 subsystems are only 2 way set associative. This means that for a given tag there are only 2 addresses stored in the cache for that tag. The stored addresses may be referred to as the way or the index. In a complex program or system having lots of branches and lots of subroutine calls, this sort of cache can detract significantly from the hit ratio because a low hit ratio results from the large number of addresses fetched having the same tag and thereby competing for the very limited number of address slots or ways.

Therefore, due to size limitations and the type of L2 cache, the misses may still represent a sizable portion of the fetches done by the processor. A miss will result in fetching from the next level of memory. This can mean significantly more CPU cycles, e.g., as many as 75 CPU cycles or more, to fetch a cache line. Of course, the cycle time is longer for accesses from main memory than for access from embedded caches.

Further complicating the main memory access times is the desire for these systems to have a shared memory between the processor(s) and data moving components (input/output devices). When designing complex systems, there are also competing design constraints. The systems are required to be accepted into standard slots provided in computer hardware. In such environments, there are also power and cost considerations that often prevent the use of the fastest processors available in servers or desktop PCs.

For these environments where space, cost and power are limitations, the system designers are faced with very limited options regarding how to minimize main memory accesses while meeting the power dissipation and cost budgets and also meeting physical space constraints.

In addition to having high hit ratios on embedded L1 and L2 caches, it is often desirable to design additional caches, which can be used to reduce data access times and make data requests to the main memory as few as possible. There are also specialized caches used by virtual memory systems to keep virtual page translation tables which are accessed frequently in memory with short access times.

Traditional caching and cast out algorithms involve some sort of algorithm, e.g., Least Recently Used (LRU), in order to determine which cache line to invalidate or cast out in favor of a newly accessed item. Unfortunately, such algorithms do not have access to information such as: how often a certain cache line is fetched; does a particular address seem to get cast out frequently; and what addresses are likely to get accessed once a given address has been fetched. Such information is very difficult to manage and make decisions upon given traditional caching hardware.

Controlling a processor's internal and external cache memory has been attempted via use of a cache controller being situated logically and physically external to the data requesting device or processor. However, an external cache controller is severely disadvantaged in performing the function of controlling the internal and external cache memory of a processor. Because the cache controller is located external to the processor and at some distance from the processor, the cache controller is unable to operate at processor speeds. The processor performs data requests faster than the external cache controller is able to comply with. The result is that the CPU may encounter stalls in its pipeline as the latency increases.

Also, according to current methods, a program which is fetching sequential data would bring in a cache line and then have hits against the data in that cache line. Then, beginning with the next cache line, the program will have to bring in the next cache line and suffer the long latency involved in fetching from main memory. If the cache system is sophisticated and does some sophisticated speculative read so that the data is in cache, there is the chance that the data will never be used.

However, since there is no mechanism to indicate that it is speculative it will age just like the other cache lines in that set. A cache line which has been accessed before may have a higher probability of being accessed again relative to those which were simply prefetched. Unfortunately, unless there is a way for the cache controller to differentiate, the prefetched line may clutter the cache until it eventually is cast out.

It can be seen then that there is a need for a method and apparatus providing non-L1 instruction caching using prefetch to increase the hit ratio of a computing system.

SUMMARY OF THE INVENTION

To overcome the limitations in the prior art described above, and to overcome other limitations that will become apparent upon reading and understanding the present specification, the present invention discloses a method and apparatus for increasing processing speed in a computing system by providing non-L1 caching using prefetch to increase the hit ratio.

The present invention solves the above-described problems by providing non-L1 caching using prefetch to increase the hit ratio. The method and apparatus is applicable to processors and advanced function embedded boards.

A method of information caching in accordance with the principles of the present invention includes buffering cache lines in a cache set, the cache lines having a parameter indicating data selection characteristics associated with each buffered cache line and determining which buffered cache lines to cast out and/or invalidate based upon the parameter indicating data selection characteristics.

In another embodiment of the present invention, a processing apparatus includes at least one processor, a memory; and a non-L1 cache, wherein the non-L1 cache includes a cache set, the cache set buffering cache lines having a bit per cache line associativity and a prefetch buffer, the prefetch buffer buffering cache lines having a bit per cache line associativity, the prefetch buffer is operatively connected to the cache set, wherein the processor uses the bit per cache line associativity of cache lines buffered in the cache set to determine which cache lines to cast out of the cache set and uses the bit per cache line associativity of cache lines buffered in the prefetch buffer to determine which cache lines to cast out of the prefetch buffer.

In another embodiment of the present invention, an information caching system includes means for storing information in cache lines, the cache lines having a bit per cache line associativity, means for storing prefetch information in cache lines, the cache lines having a bit per cache line associativity, the means for storing prefetch information is operatively connected with the means for storing information and means for determining which cache lines to cast out of the means for storing information and the means for storing prefetch information based upon the bit per cache line associativity of cache line stored respectively therein.

In another embodiment of the present invention, an article of manufacture including a program storage medium readable by a computer is disclosed. The medium tangibly embodies one or more programs of instructions executable by the computer to perform an instruction caching method, the method including buffering cache lines in a cache set, the cache lines having a bit per cache line associativity and determining which buffered cache lines to cast out based upon the bit per cache line associativity.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for optimizing the hit ratio of a processor by providing a processor with a non-L1 cache that prefetches data stored therein to increase the hit ratio. Herein the term "data" will be used to signify any information contained in memory. For example, program instructions, data and/or any other information may be buffered in cache lines of the prefetch buffer or a cache set. The caching method firmware may be downloaded into memory to implement the optimization method, to reset the hard processor core and to implement the downloaded firmware. The caching method is extremely flexible. The non-L1 caching method is programmable and thus is able to adapt to different workloads quickly and easily.

Figures 1, 2:
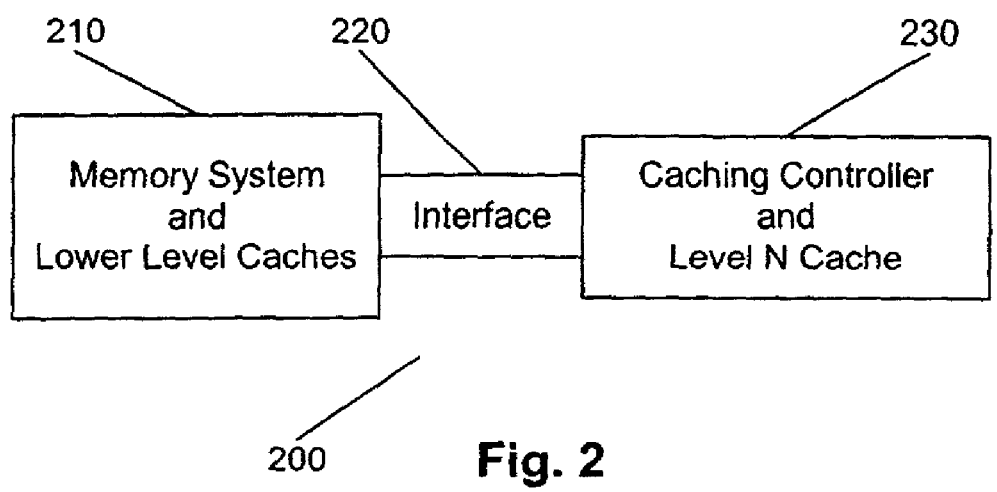
FIG. 1 illustrates a table showing relative access times for a computing system.
FIG. 2 illustrates the relationship of a caching assistant to a caching system through an interface according to an embodiment of the invention.

FIG. 1 illustrates a table 100 of memory access times. In FIG. 1, relative access times 130 for a 500 MHz processor having embedded L1 and L2 caches and a main memory with a 32 byte cache line and 64 bit L2 access width in accordance with an embodiment of the invention are shown. Table 100 shows relative access times 130 and the number of cycles needed to perform an access 120 for a 500 MHz processor with various access types 110. In column 110 the access types are disclosed. Embedded L1 cache access 140 is shown accessing data in one (1) cycle in column 120 and taking 2 nanoseconds (ns), as shown in column 130. Similarly, embedded L2 cache access 150 is shown accessing data in 5 cycles and taking 10 ns. Main memory access 160 is shown accessing data in approximately 75 CPU cycles and taking 150 ns. Clearly, it is desirable to avoid main memory access, if possible. Numerous factors may influence table 100 and therefore the numbers may be different in various applications.

However, the magnitude of the difference between a cache access (140 or 150) and a main memory access 160 will be similar. As CPU cycle time decreases the difference between memory cycle time and processor cycle time increases. It should be noted that a memory access may be a read function, a write function or another function. In order to optimize program execution speed, accesses to main memory are minimized. The values illustrated in FIG. 1 are given for purposes of demonstration and the present invention is not limited to the values shown in the table 100.

Because the magnitude of difference between a cache access time and a main memory access time is great, accesses to main memory should be minimized. Preferentially, data and instruction accesses should be available in an embedded cache, whenever possible.

FIG. 2 is a block diagram of a caching system 200. FIG. 2 shows the relationship between the caching controller and level N cache 230 and a memory and lower level cache 210 through an interface 220. The caching controller and level N cache 230 works in conjunction with the memory and lower level cache 210 to provide a requesting device with the most relevant information accesses. The information may include data, instructions or both. Increasing the likelihood that an access will be found in a particular cache improves the hit ratio and increases overall processing speed. The interface 220 between the memory and lower level cache 210 and caching controller and level N cache 230 allows the caching controller and level N cache 230 to de-stage updated information to the main memory. There are registers in the memory and lower level cache 210 that the caching controller and level N cache 230 can set which disallow write caching to certain address ranges.

Figure 3:
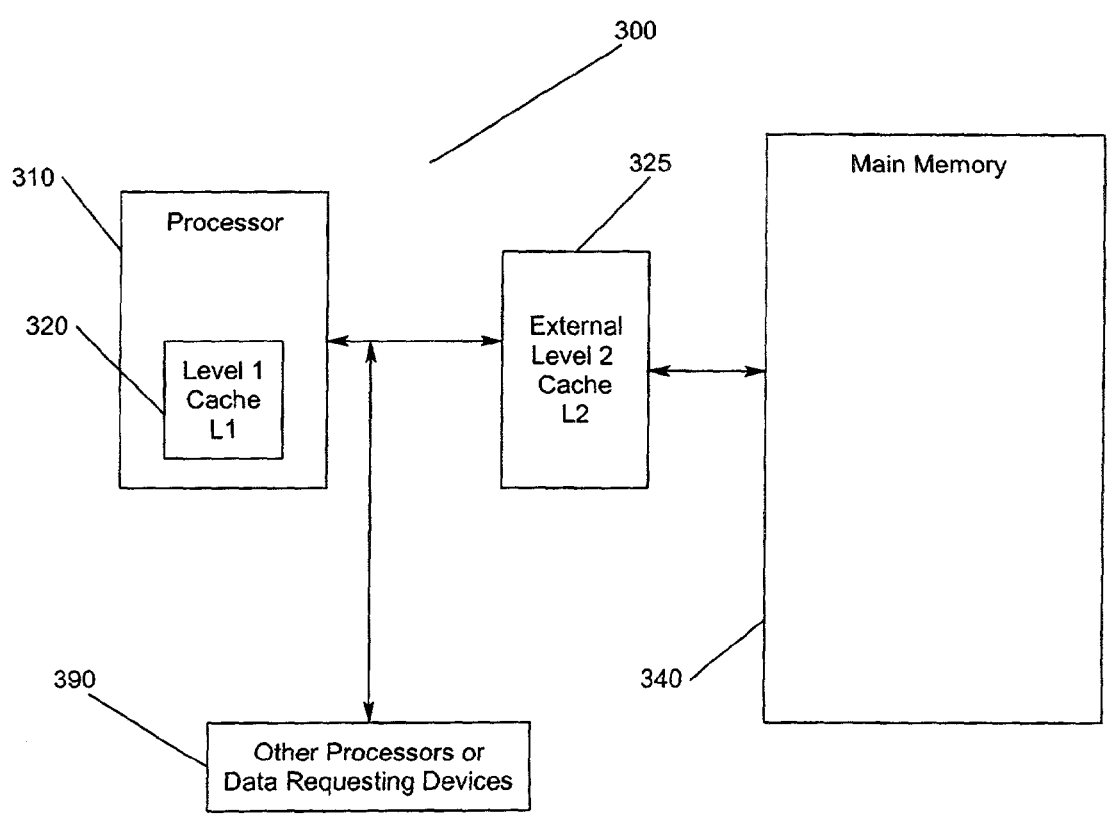
FIG. 3 illustrates a computing system with a processor having an embedded L1 cache memory according to an embodiment of the invention.

FIG. 3 illustrates a computing system 300 of an embodiment of the present invention. In FIG. 3, a data or information request originates at the processor 310. A request to access information begins by inspection of the embedded level one L1 cache 320. In this system, a level one L1 cache 320 has been embedded on the processor 310. If the requested data is present or accessible from the L1 cache 320, the information is accessed and available for immediate processing at the processor 310. This is an optimal situation, because the time required to access information from the L1 cache 320 is the shortest possible time.

However, if the data or instruction is not present in the L1 cache 320, the external level two (L2) cache 325 is inspected for the requested data. The L2 cache 325 has a larger data storage capacity than the L1 cache 320. If the information is present in the L2 cache 325, the information is submitted to the processor 310 for processing and the information is also submitted to the L1 cache 320 for storage therein. Storing the retrieved information in the L1 cache 320 provides a more rapid access of the information in future accesses. Accessing the information from the L2 cache 325 is less desirable than accessing the information from the L1 cache 320. In accessing information from the L2 cache 325, time is lost looking for the data in the L1 cache 320, looking for information in the L2 cache 325, sending the information to the L1 cache 320 for storage therein and sending the information to the processor 310 for processing. Accessing information from the L2 cache 325 is, however, more desirable than accessing the information from the main memory 340.

If the data or instruction requested is not present in either of the L1 or L2 caches, 320 or 325, respectively, the main memory 340 must be inspected to access the data or instruction. Both of these caches run at the same frequency as the processor. Time is lost in accessing the information in the same way as in the access of the L2 cache 325. The access time increases as the system progresses down the hierarchy. For example, after looking for the information in both of the L1 and L2 caches, 320 and 325, respectively, the main memory is searched. This is a time consuming undertaking because of the vast amounts of information which are searched to find the requested information. Additional time is lost due to the distance from the processor 310 which the information travels upon being found in the main memory 340. The information is stored in both the L2 cache 325 and subsequently the L1 cache 320. The information is submitted to the processor 310 for processing. In the computing system according to an embodiment of the invention, other processors and requesting devices may be linked 390 to effectively share data and/or instructions therewith.

Figure 4:
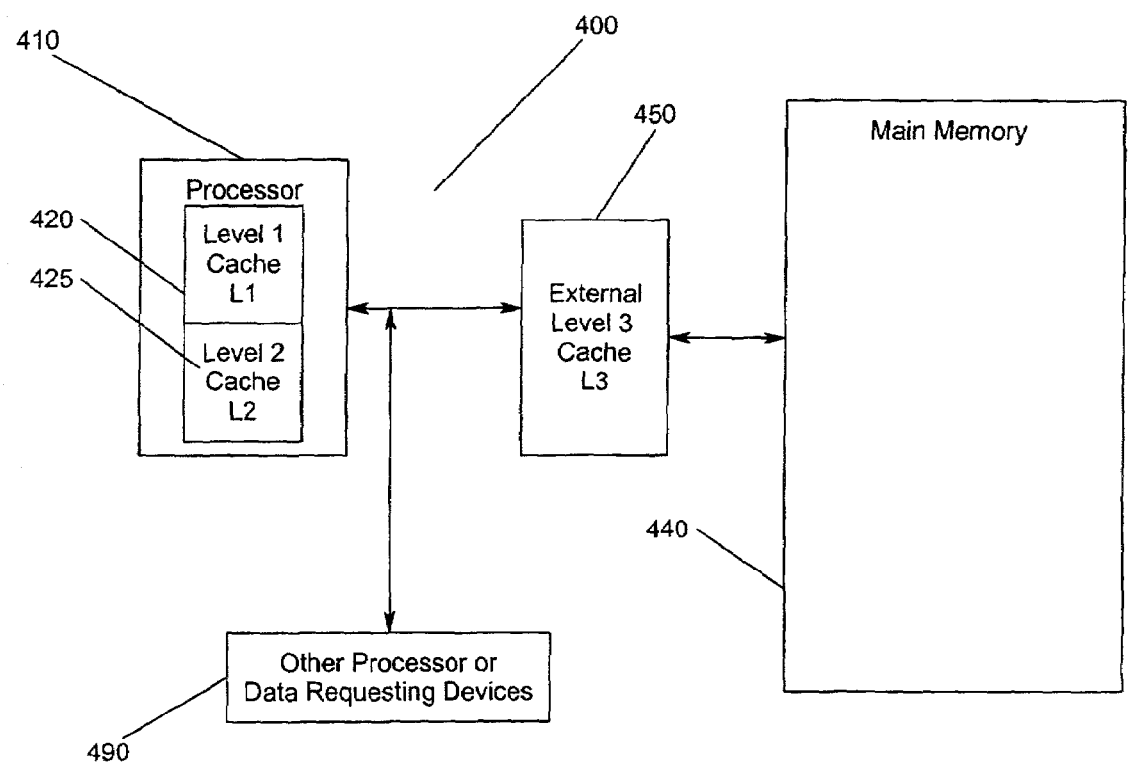
FIG. 4 illustrates another computing system with a processor having both L1 and L2 embedded caches according to an embodiment of the invention.

FIG. 4 illustrates another computing system 400 according to an embodiment of the invention. In FIG. 4, a data or information request originates at the processor 410. An access request begins by inspection of the embedded level one L1 cache 420. If the requested information is present or accessible from the L1 cache 420, the information is accessed and available for processing at the processor 410. This is the more desirable situation, because the time required to access the information is the shortest possible time.

However, if the data or instruction is not present in the embedded L1 cache 420, the embedded level two L2 cache 425 is inspected for the requested data. The embedded L2 cache 425 has a larger data capacity than the embedded L1 cache 420. If the information is present in the embedded L2 cache 425, the information is submitted to the processor 410 for processing and the information is also submitted to the embedded L1 cache 420 and stored therein.

Storing the retrieved information in the embedded L1 cache 420 provides a more rapid access of the information in the event of future data requests. Accessing the information from the embedded L2 cache 425 is less desirable than accessing the information from the embedded L1 cache 420. In accessing information from the L2 cache 425, time is lost looking for the information in the L1 cache 420, looking for information in the L2 cache 425, sending the information to the L1 cache 420 for storage therein and sending the information to the processor 410 for processing.

If the data or instruction requested is not present in either of the L1 or L2 caches, 420 or 425, respectively, the external level three L3 cache 450 is inspected to access the data or instruction. Time is lost in accessing information in the same way as in the access of L2 cache 425. The access time increases as the system progresses down the hierarchy. For example, after looking for the information in both of the L1 and L2 caches, 420 and 425, respectively, the L3 cache 450 is searched. The information is stored in both the L2 cache 425 and then the L1 cache 420. The information is submitted to the processor 410 for processing. Accessing information from the L3 cache 450 is still more desirable than accessing the information from the main memory 440.

If the data or instruction requested is not present in either of the L1, L2 or L3 caches, 420, 425 or 450, respectively, then the main memory 440 is inspected to access the data or instruction. Time is lost in accessing the information in the same way as in the access of L3 cache 450. The access time increases as the system progresses down the hierarchy. For example, after looking for the information in the L1, L2 and L3 caches, 420, 425 and 450, respectively, the main memory 440 is searched. Eventually the data may be found and submitted to the processor 410 for processing. In a computing system according to an embodiment of the invention, other processors and requesting devices may be linked 490 to effectively share data and instructions therewith.

Figure 5:
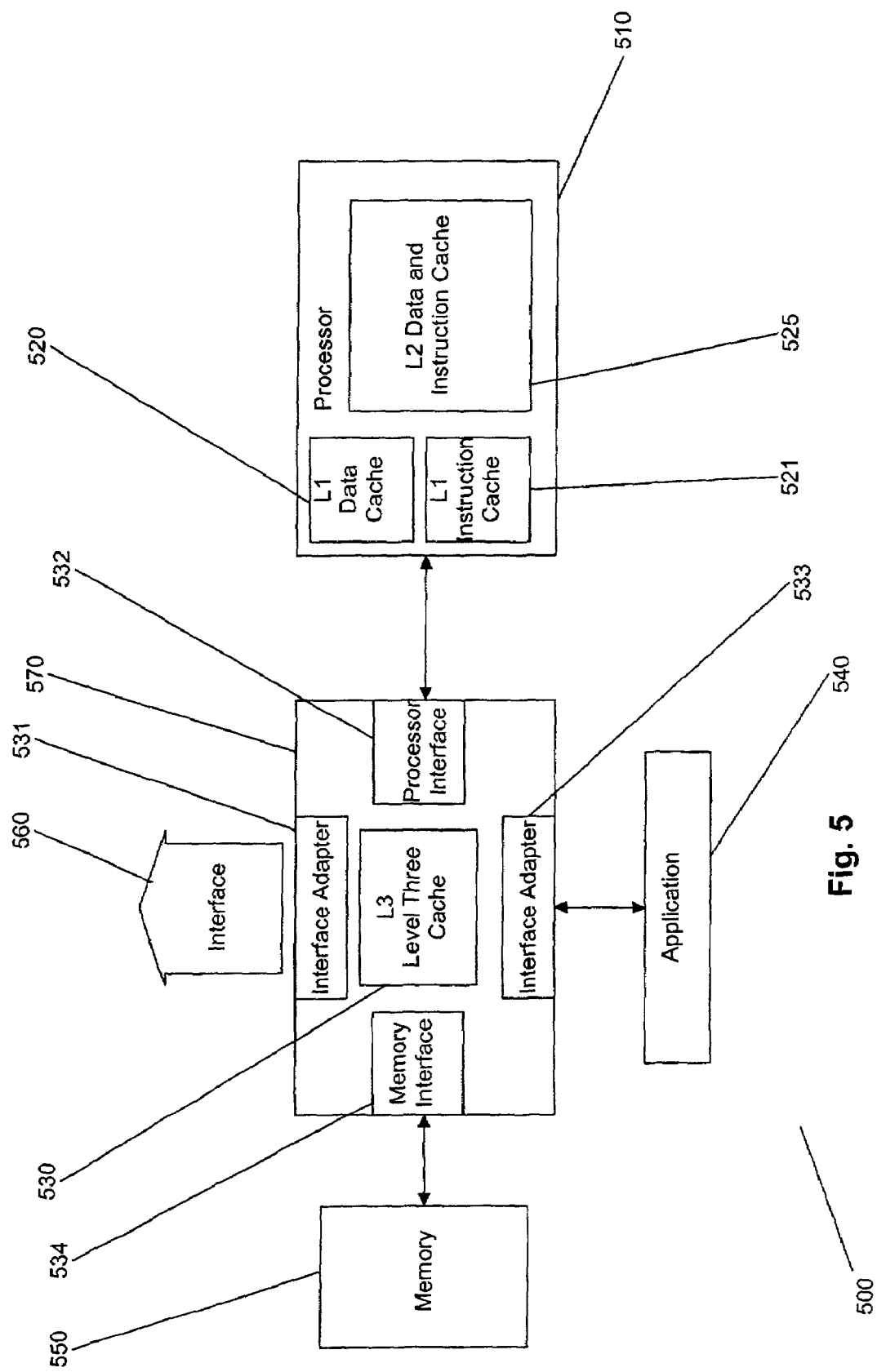
FIG. 5 illustrates a non-L1 cache and interface according to an embodiment of the present invention.

FIG. 5 is an apparatus 500 according to an embodiment of the present invention. In FIG. 5, data flow through the apparatus 500 is disclosed. The apparatus 500 including an L3 cache 530 and associated interface devices (831, 532, 533 and 534) may be designed to perform a variety of functions. The apparatus 500 disclosed in FIG. 5 includes a processor 510. The processor 510 shown has both an embedded L1 data cache 520 and an embedded L1 instruction cache 521. The processor 510 shown also includes an embedded L2 data and instruction cache 525.

The apparatus 500 also includes a processor bridge 570. The processor bridge 570 functions as a memory controller and a host interface controller. Embedded within the processor bridge 570 is an L3 cache 530. The L3 cache 530 may store data exclusively, instructions exclusively, or both data and instructions. In a preferred embodiment, the L3 cache 530 stores instructions only, thus eliminating the need to needlessly and continuously invalidate and cast out repetitively accessed data, while retaining more cache lines, i.e. instructions therein.

The processor bridge 570 is provided with a plurality of interactive devices. The processor bridge 570 is provided with a processor interface 532 permitting communication with the processor 510. The processor bridge is also provided with a memory interface 534 permitting communication with a memory system 550. The memory 550 may include dynamic RAM (DRAM), synchronous dynamic RAM (SDRAM), extended data out (EDO) DRAM, Synchronous Static RAM, Double Data Rate Synchronous DRAM, video RAM, or any kind of fast memory device or system.

The processor bridge 570 is also provided with a plurality of interface adapting devices 531 and 533. The interface adapting devices 531 and 533 may interface to a non-volatile memory, or may include a fiber channel interface, an Ethernet interface, a router interface, a video or audio interface, a multimedia interface, a monitor interface, a camera interface, a joystick, a gaming controller or any other type of interactive device. The interface adapting devices 531 and 533 are adapted to perform application specific functions 540 and interact through an interface 560 to communicate with interactive devices. The specific device function defines the main purpose of the apparatus 500. A function of the apparatus 500 is to transfer information to and from interactive devices, applications 540, memory 550 or the processor 519. Providing an L3 cache 530 on an apparatus 500 results in faster processing time.

Figure 6:
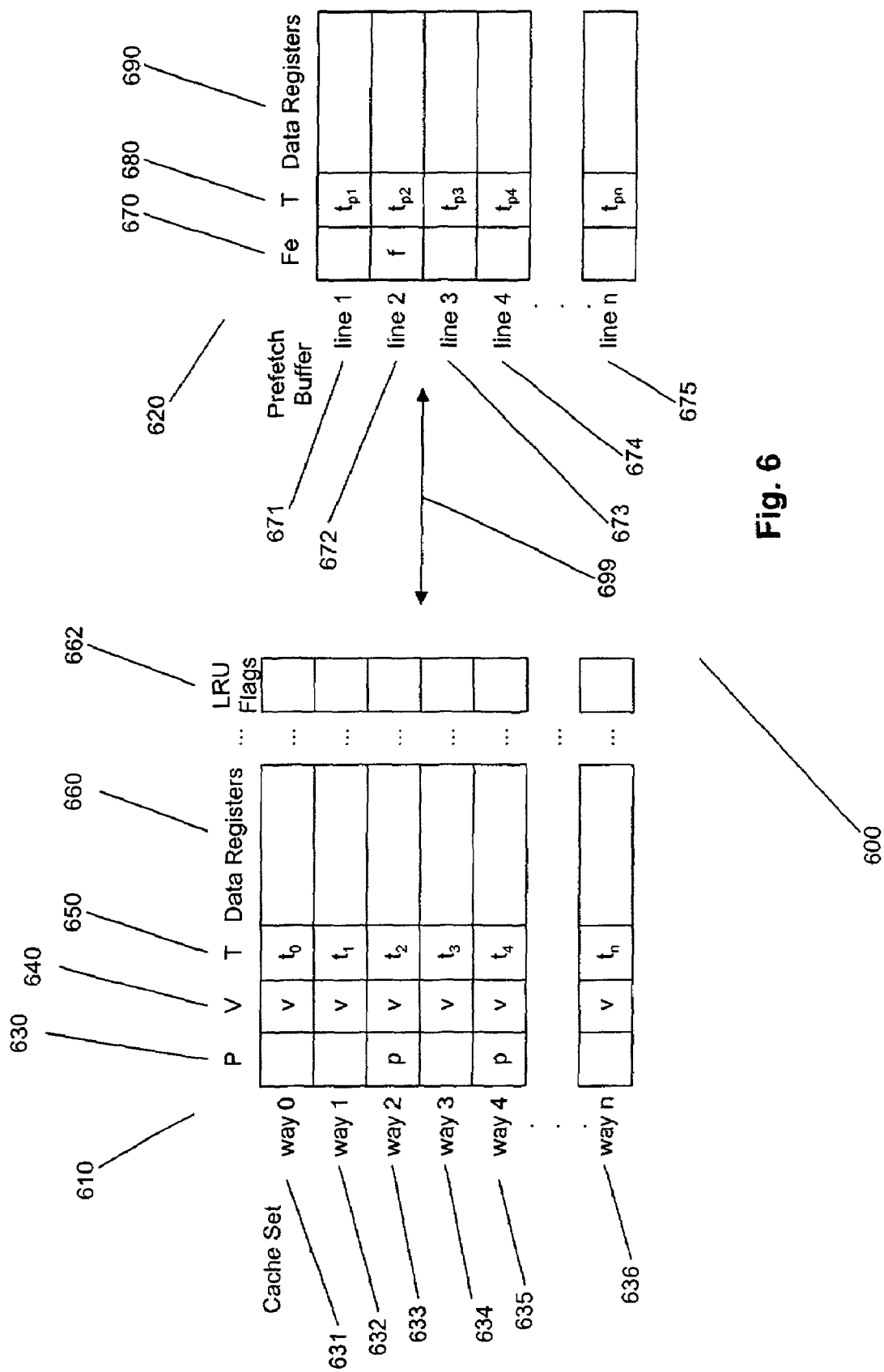
FIG. 6 illustrates a cache memory and an associated prefetch buffer for a non-L1 cache according to an embodiment of the present invention.

FIG. 6 is a diagram 600 of a cache memory and an associated prefetch buffer. In FIG. 6, the diagram 600 illustrates a relationship between a cache set 610 and an associated prefetch buffer 620 of the L3 cache. The cache set 610 is provided with a plurality of cache ways, cache lines or addresses to cache lines (way 0 through way n, 631–636, respectively). Each cache way in cache set 610 is provided with a prefetch tag or flag P 630, a valid tag or flag V 640, an optional timestamp T 650 and L data storage registers 660. There are L data storage locations 660 for storing a cache line in each way of the set. LRU flags 662 represent the order in which a way is to be cast out. The flags can be implemented in many different ways. There are m sets 664 of LRU flags per cache set and one set per way. The number of LRU flags is represented by m in this statement: $2^m$=number of ways. Therefore if there are 8 ways, then m=3 LRU flags 662 are required. If there are 16 ways, then 4 LRU flags 663 are required. The cache set 610 is operatively coupled 699 for communication with the associated prefetch buffer 620.

The prefetch tag 630 provides bit per way or bit per cache line inspection, according to the present invention. Since each cache line can be prefetched, there must be one prefetch bit per way. This prefetch bit along with the LRU bits will be used during the cast out or invalidate process.

Information likely to be requested by the processor is prefetched into the prefetch buffer 620. Each cache line is provided with a fetch tag or flag Fe 670, an optional timestamp 680 and L storage registers 690. The fetch flag is the valid flag for this buffer. This fetch buffer is a temporary holding area until the cache can be updated with each cache line. The reason for it is that the cache controller would request N cache lines at a time and have to update each cache line individually. The buffer would hold these lines until they were updated. The processor using the prefetch buffer would initiate a search of the cache tags for the particular location being addressed. At the same time, the prefetch buffers would be searched. If the cache had a hit, then that data would be sent to the processor. If not, but the prefetch buffer had a hit and the fetch flag indicated valid then that data would be sent to the processor. If neither is a hit, then the access is a miss and the memory next in the hierarchy has to be searched.

Information stored in the cache lines (671–675, respectively) of the prefetch buffer 620 may be accessed by the cache controller and placed in the cache set 610 or given to a requesting processor, i.e., the next higher level in the hierarchy. If the cache is a cache with copy back capability then there would need to be a (D)irty flag as well indicating the cache line had been written but had not been flushed to the next memory level yet.

The prefetch flag P 630 indicates that the particular cache line has been prefetched but not requested by the processor. Prefetch flags p are shown turned on for way 2, 633 in FIG. 6, and way 4, 635 in FIG. 6, in column P 630. The prefetch flag shown in column 630 is used in conjunction with the valid tag V flag 640 to determine which cache line or way is to be invalidated or cast out. In FIG. 6, all the ways (631–636) are shown as being valid v, that is, each way contains valid data from the main memory. In other words, this data can be safely provided to the processor if he is requesting that address. If the V was 0 for a particular way, it means that the line is empty. Because the line is empty, the cache space is ready to receive another cache line.

When the cache set is full and the V flags 640 are all active, but the address tags for a data request does not match any of the tags in the cache set, then there was a miss. The cache controller will fetch this cache line and prefetch the next X cache lines from the memory system. The cache line being accessed is delivered to the processor. The cache controller must now determine which way for this cache set to replace with this most recently used cache line. Since a (p) flag being set to ON, i.e., P=1, means that the data has not actually been accessed, a determination is made as to which one of that group with P=1 should be replaced with this cache line. LRU is a common algorithm, although not a required algorithm to use. Using that example, the cache controller would determine the least recently used way according to the LRU flags 662 with P=1 to replace with this cache line. The new cache line would have the V flag 640 set to one and the P flag 630 set to 0 since it was actually accessed. If there were no ways with P=1 then the cache controller would select the way which was least recently used from the group of ways with p=0, V=1.

The Prefetch buffer 620 would now hold the x lines which were prefetched. The cache controller would index into the cache sets using the tags for each item. If there were any empty locations, then the prefetched item is placed in that location along with P=1 and V=1. If there were no empty locations then the cache controller would select a way from that group of lines which have P=1 to replace with this prefetched item. If there were no ways with P=1, then the prefetched line is discarded. After each buffered cache line was handled then the Fe flag 670 for that line would be deasserted.

In one embodiment of the present invention, precise times of accessions may be represented through use of timers and the application of timestamps 650 and 680 to data requests, the timestamps 650 and 680 being recorded, stored in a register of an associated cache line.

According to the present invention, timestamps are purely optional and would tremendously complicate the preferred embodiment of this invention because the present invention is preferred to be implemented via a cache controller and not a caching assistant microprocessor. The optional timestamps, illustrated in column 650 as $t_0, t_1, t_2, t_3, t_4, \ldots, t_n$ and in column 680 as $t_{p1}, t_{p2}, t_{p3}, t_{p4}, \ldots, t_{pn}$, represent the time of accession of the cache line. The timers being used to apply optional timestamps 650 and 680 to accesses, hits, misses and address requests.

A least recently used (LRU) flag 662 and the timestamps 650 and 680 may be used to determine when stored data is to be cast out of a particular cache level. Least recently used flags 662 are stored in registers and may be altered. Although a least recently used algorithm has been disclosed for purposes of example, any type of algorithm may be used to determine the oldest cache entry.

Alternatively, an invalidation may be determined without the prefetch flag p 630. Through inspection of the prefetch buffer 620 and particularly the fetch tag, f as shown in line 2 672, in column 670, or flag Fe 670, it can be determined that a cache line 671 to 675 has been fetched by the processor directly from the prefetch buffer 620 bypassing the cache set 610 altogether.

Figure 7A:
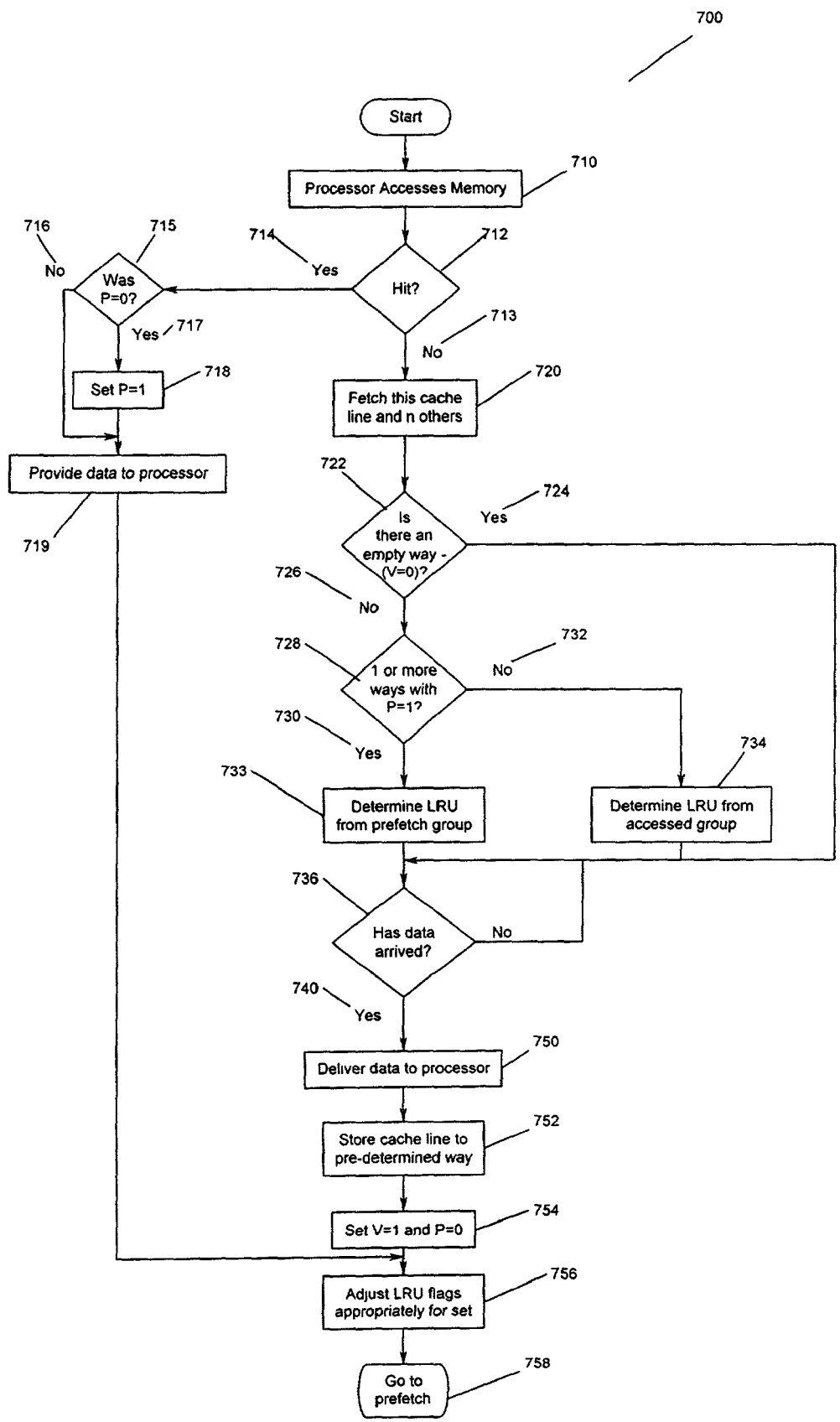
FIGS. 7a–b show a flowchart illustrating a method of invalidating cache lines according to an embodiment of the present invention.
Figure 7B:
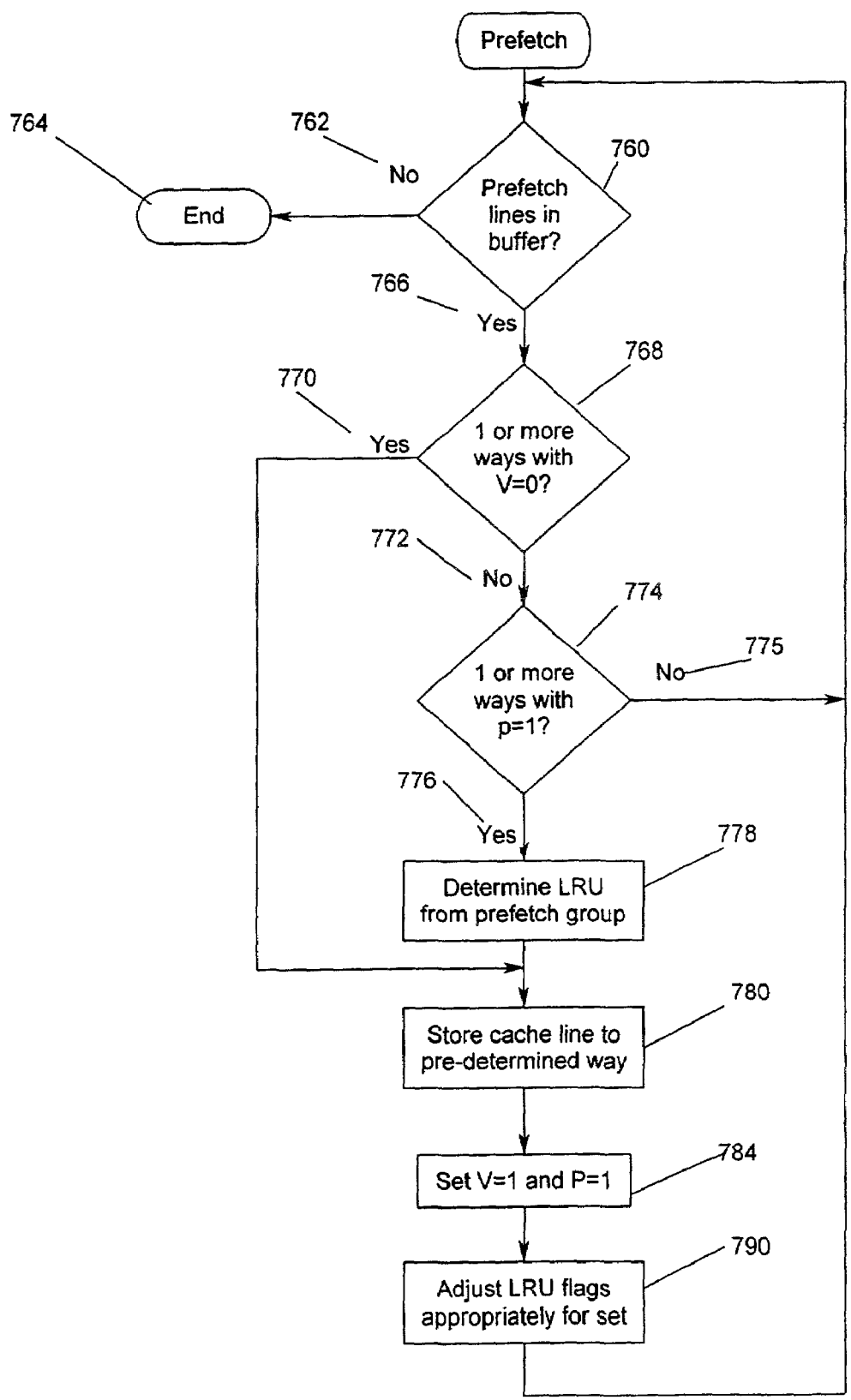

FIGS. 7a–b show a flowchart 700 illustrating a method according to the present invention. In FIG. 7, a flowchart 700 illustrating a method of determining which cache line to invalidate or cast out when a miss is encountered is disclosed.

When an access is made to this memory level 710, then the cache controller first determines if that cache line is present in the cache 712. If it is a hit 714, a determination is made whether P is set to 0 715. If not 716, then the cache controller responds with the data 719. If P is set to 0 717, the cache controller will set the P flag for that cache line to 1 718 meaning that the cache has been accessed and not merely prefetched. The cache controller will then modify the LRU bits for each way that has P=0 to indicate that this way was most recently used. There is no prefetching within the preferred embodiment if there is a hit 714.

If the data was not in the cache 713, then the cache controller will request this cache line and N others from the next level of memory 720. (Of course, the cache controller could make a parallel request to the next level of memory at the same time it is checking for residency in cache. If the access turned out to be a hit then it would have to cancel the request. If it was a miss then the access time would be improved by starting the request early.) The cache controller determines which cache line to replace while the data is being retrieved. A determination is made whether there is an empty way 722. If there is an empty cache line (V=0) 724, then the data will be placed there when retrieved. If all ways within the set are used 726, then the cache controller will look first at those with P=1 728 (Prefetched but not accessed). If one or more ways with P=1 730, the LRU of that group will be the one replaced 733. The cache controller must cast it out if it is dirty or simply replace it if it is not dirty. If all ways within the set are used and none of them are prefetched but not accessed 732, then the cache controller will select the LRU way from all the ways in the set 734. The cache controller waits for the data to arrive 736. Once the data is received by the cache controller 740, the cache controller delivers it to the processor 750 and places the data into the way determined 752. The V flag will be set to 1 and the P flag set to 0 754. Once an element with the P bit ON has been requested, the P bit is turned OFF and that element moves to the most recently used member of the P bit OFF group. Then, the LRU flags are appropriately set 756. Then the system goes to the prefetch routine 758.

In the prefetch routine, a determination is made whether the lines in the buffer should be placed within the cache 760. If there are no prefetch lines left in the prefetch buffer 762, then the method ends 764. If there is at least one line left in the prefetch buffer 766, then for the cache set indicated by the tags for that prefetch line, check to see if there are any ways which are empty (V=0) 768. If so 772, then the cache line is stored at that way 780 and V=1 and P=1 are set 784. The LRU flags are adjusted appropriately for the prefetch group 790 and the method proceeds to the next line in the prefetch buffer 760. If all ways have V=1 772, then a determination is made whether 1 or more ways have been prefetched but not accessed 774. If so 776, the LRU from the prefetch group is determined 778 and that way is replaced with the line in the prefetch buffer 780. The cache controller must then set V=1 and P=1 784 and adjust the LRU flags appropriately for the prefetch group and proceed to the next line in the prefetch buffer 790. If there are no ways with P=1 775, then that line in the buffer is thrown out and the next cache line in the prefetch buffer is analyzed 760.

Of course, the present invention is still valid the method determined that replacing the LRU of the non-prefetch ways with the prefetched cache line provided better performance.

Figure 8:
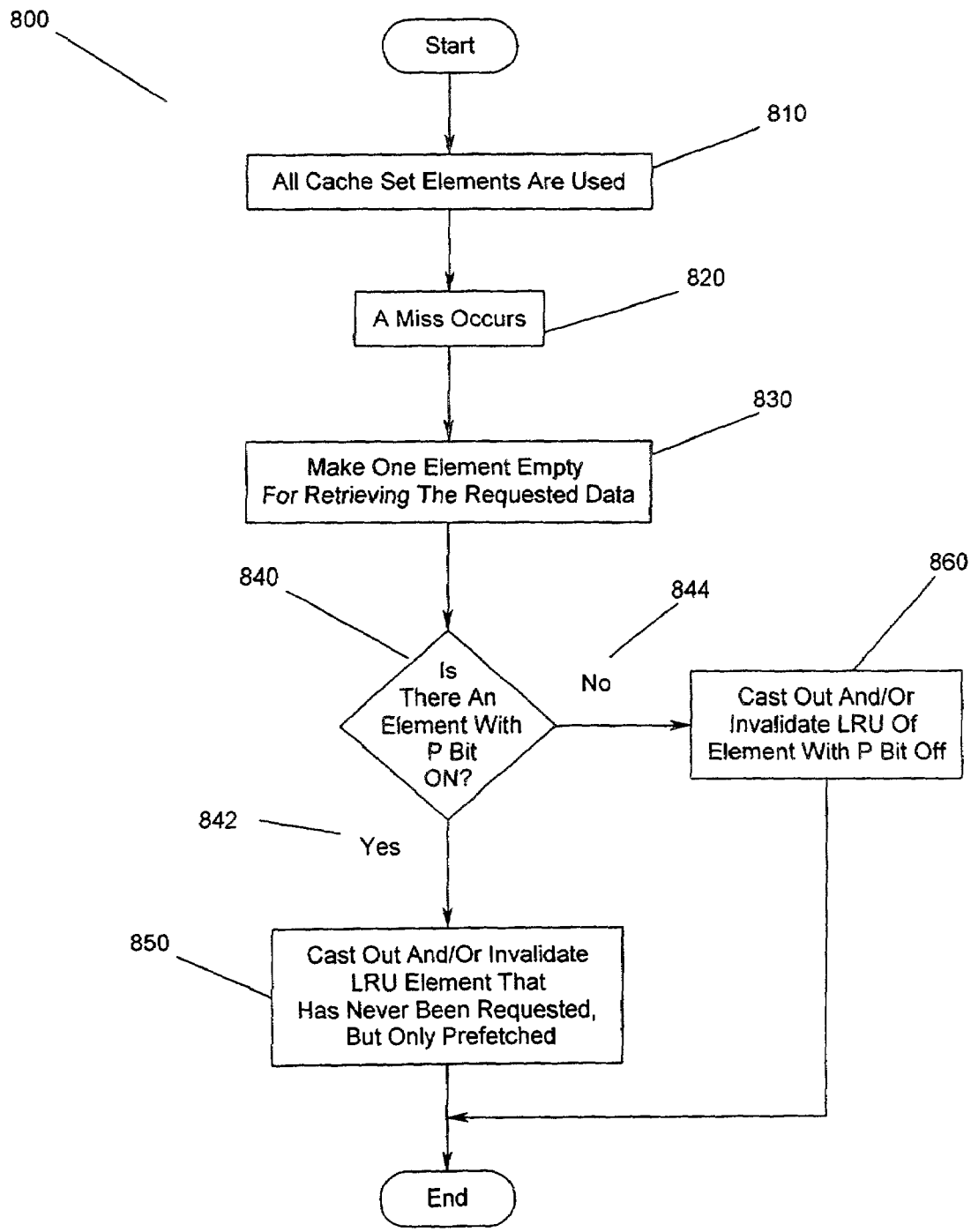
FIG. 8 is a flowchart illustrating a method of non-L1 caching using prefetch to increase the hit ratio according to another embodiment of the present invention.

FIG. 8 is a flowchart 800 illustrating a method of non-L1 caching using prefetch to increase the hit ratio according to another embodiment of the present invention. When all cache set elements are used 810 and there is a miss 820 and one element has to be made empty for retrieving of the requested data 830, all elements with P bit ON are grouped together and all those with the P bit OFF are grouped together 840. If a P bit is ON 842, that the element has never been requested only prefetched and the LRU of that group will be cast out or invalidated first to make room for the new information 850. Only when there are no elements with the P bit ON 844 does the cache controller select the LRU of those elements with the P bit OFF 860.

Figure 9:
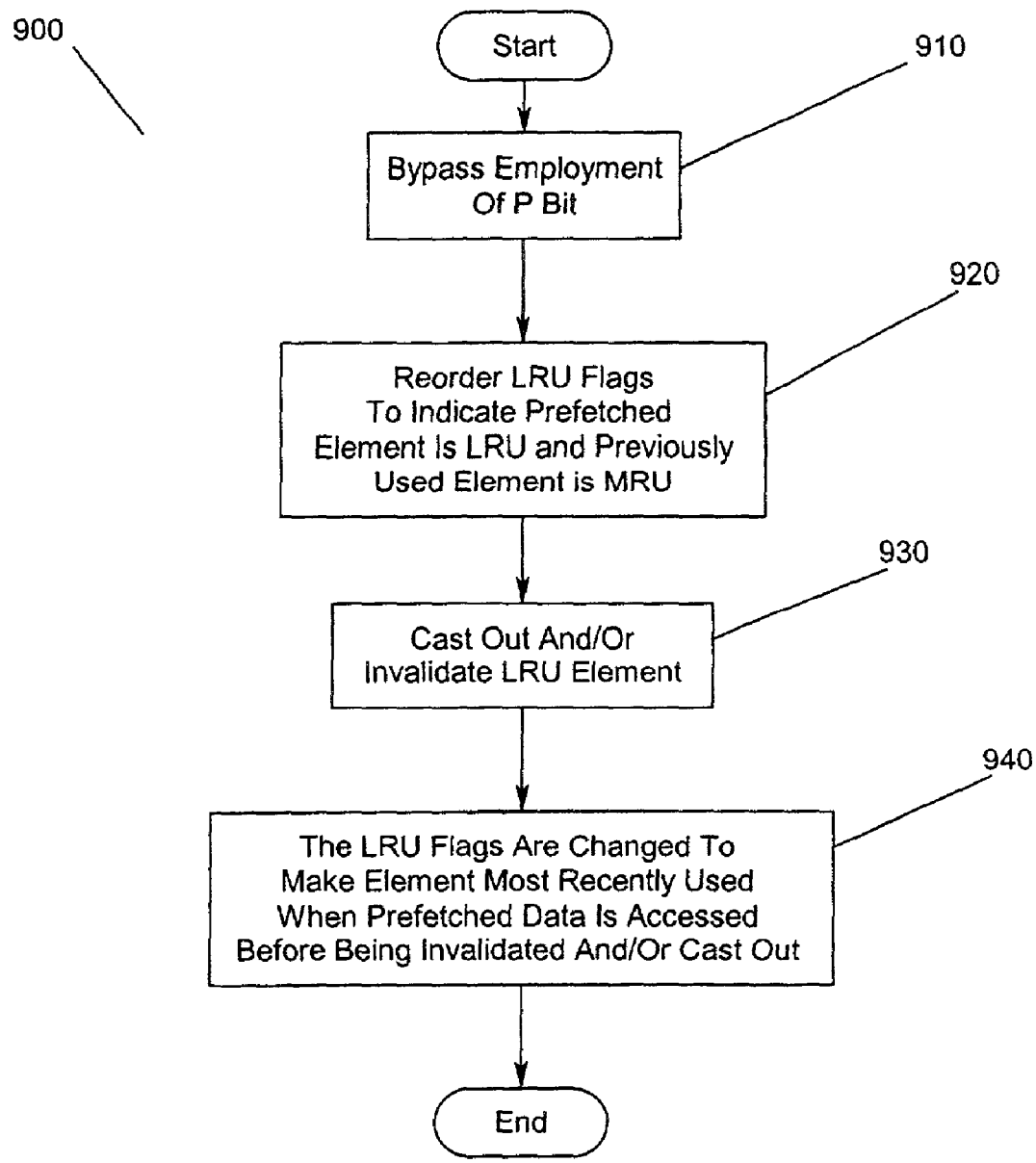
FIG. 9 is a flowchart illustrating a method of non-L1 caching using prefetch to increase the hit ratio according to another embodiment of the present invention.

FIG. 9 is a flowchart 900 illustrating a method of non-L1 caching using prefetch to increase the hit ratio according to another embodiment of the present invention. The embodiment of FIG. 9 sets the LRU flags to indicate the prefetched data as least recently used. First the method bypasses employing the P bit 910. Then, the LRU bits are reordered by setting the LRU flags to indicate that prefetched data is least recently used 920. For example, if there are 8 ways per cache set, then each cache set has 3 bits to denote in what order it was accessed. The element which is least recently used will be invalidated or cast out if a miss occurs on this cache set. Normally, prefetched data would look like most recently used data. However, prefetched data usually has a lower likelihood of being accessed than data that has previously been accessed. Therefore, setting the LRU flags to indicate that prefetched data is least recently used 920 according to this embodiment allows the prefetched data to be invalidated before elements that were used previously 930. If prefetched data is accessed before be invalidated or cast out, then the LRU flags are changed as per norm to make it most recently used 940.

Figure 10:
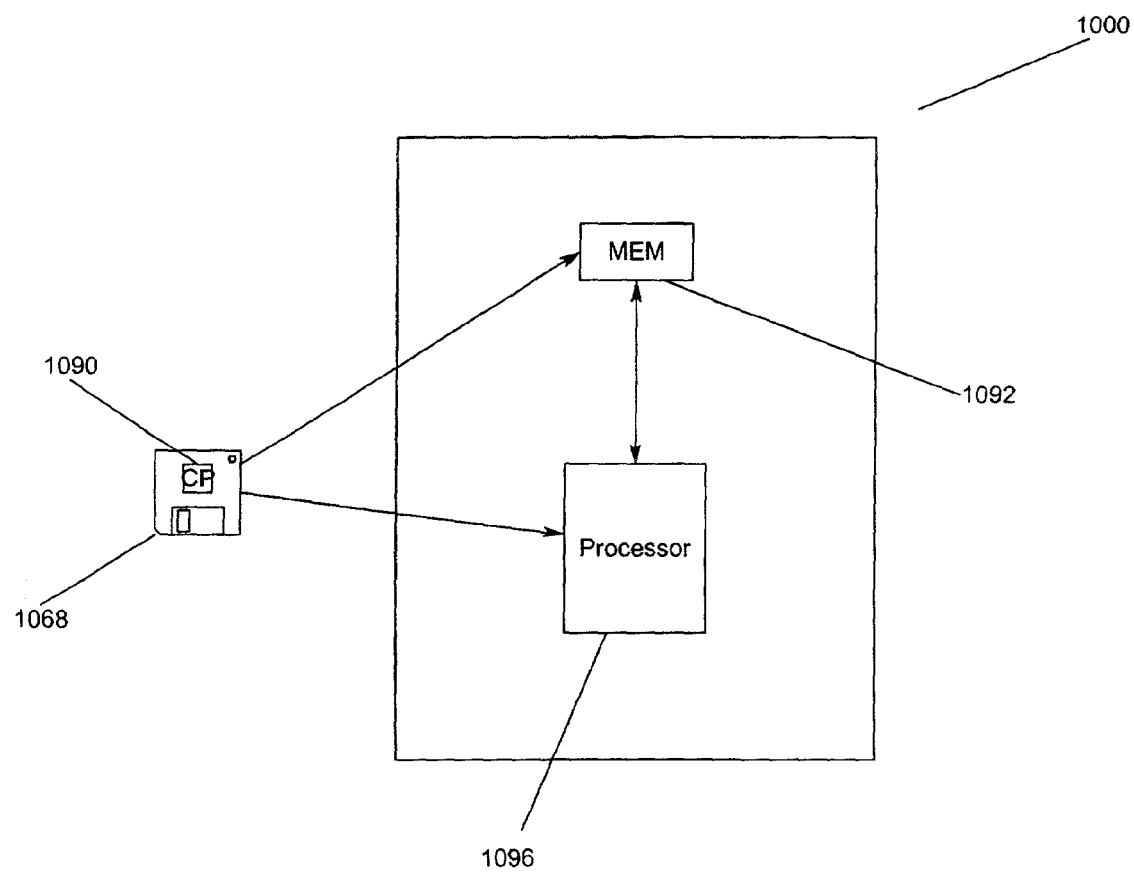
FIG. 10 illustrates a computer-readable medium or carrier having a computer program comprising instructions which, when read and executed by the controller causes the controller system to perform the steps necessary to execute the steps or elements of the present invention.

FIG. 10 illustrates a controller system 1000 according to the present invention. In FIG. 10, the processes illustrated with reference to FIGS. 7–9, may be tangibly embodied in a computer-readable medium or carrier, e.g. one or more of the fixed and/or removable data storage devices 1068 illustrated in FIG. 10, or other data storage or data communications devices. A computer program 1090 expressing the processes embodied on the removable data storage devices 1068 may be loaded into the memory 1092 or the processor 1096 to configure the controller system 1000 of FIG. 10, for execution. The computer program 1090 comprises instructions which, when read and executed by the controller system 1000 of FIG. 10, causes the controller system 1000 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description.

What is claimed is:

1. An information caching method comprising:
    storing data for processing by a processor in a cache set for storing,
    setting a set of indicators for the cache set, the set of indicators including a parameter indicating whether the cache line has been prefetched but not requested by the processor, a parameter indicating whether the cache line is valid and a rank flag used for ranking cache lines for being cast out; and
    storing data that is prefetched in a prefetch buffer, the prefetch buffer being associated with the cache set, wherein the prefetch buffer includes a fetch tag for indicating a cache line in the prefetch buffer has been fetched by the processor directly thereby bypassing the cache set,
    delivering to the processor data having an address tag matching a data request from the processor; and
    determining which cache line in the cache set to cast out and/or invalidate based upon an analysis of the set of indicators of the cache set.

2. The method of claim 1, wherein the determining which cache line in the cache set to cast out and/or invalidate further comprises selecting a cache line having a parameter indicating that the cache line has been prefetched but not requested by the processor and having a lowest ranking as indicated by the rank flag, casting out the selected cache line and replacing with a most recently used data and resetting the set of indicators to reflect a new state for the cache set.

3. The method of claim 1, wherein the determining which cache line in the cache set to cast out and/or invalidate further comprises selecting a cache line having only a lowest ranking as indicated by the rank flag when a cache line in the cache set does not include a parameter indicating that the cache line has been prefetched but not requested by the processor, casting out the selected cache line and replacing with a most recently used data and resetting the set of indicators to reflect a new state for the cache set.

4. The method of claim 1, wherein the determining which cache line in the cache set to cast out and/or invalidate further comprises moving cache lines in the prefetch buffer to the cache set into empty locations if available and setting the a parameter to indicate that the cache line has been prefetched but not requested by the processor and a parameter to indicated that the cache line is valid.

5. The method of claim 1, wherein the determining which cache line in the cache set to cast out and/or invalidate further comprises moving cache lines in the prefetch buffer to the cache set into locations having the parameter set to indicate that the cache line in the cache set has been prefetched but not requested by the processor.

6. The method of claim 1, wherein the determining which cache line in the cache set to cast out and/or invalidate further comprises discarding the cache line in the prefetch buffer when there are no empty locations in the cache set and no locations have the parameter set to indicate that the cache line in the cache set has been prefetched but not requested by the processor.

7. The method of claim 1 further comprising setting a timestamp to indicate a precise time of accession.

8. The method of claim 1, wherein the setting rank flag used for ranking cache lines for being cast out further comprises setting an LRU indicator for use in ranking cache lines according when last used.

9. The method of claim 8, wherein the setting rank flag used for ranking cache lines for being cast out further comprises changing the LRU flags to most recently used when data in the cache set is accessed before being invalidated or cast out.

10. A processing apparatus comprising:
   at least one processor for requesting data matching an address tag;
   a memory;
   a cache controller; and
   a cache hierarchy, comprising;
      a cache set for storing data for processing by a processor, wherein the cache set includes a set of indicators for the cache set, the set of indicators including a parameter indicating whether the cache line has been prefetched but not requested by the processor, a parameter indicating whether the cache line is valid and a rank flag used for ranking cache lines for being cast out; and
      a prefetch buffer for storing data that is prefetched, the prefetch buffer being associated with the cache set, wherein the prefetch buffer includes a fetch tag for indicating a cache line in the prefetch buffer has been fetched by the processor directly thereby bypassing the cache set,
   wherein the cache controller delivers data having an address tag matching the data request to the at least one processor and determining which cache line in the cache set to cast out and/or invalidate based upon an analysis of the set of indicators of the cache set.

11. The method of claim 10, wherein the cache controller selects a cache line having a parameter indicating that the cache line has been prefetched but not requested by the processor and having a lowest ranking as indicated by the rank flag, casts out the selected cache line, replaces the cast out cache line with a most recently used data and resets the set of indicators to reflect a new state for the cache set.

12. The method of claim 10, wherein the cache controller selects a cache line having only a lowest ranking as indicated by the rank flag when a cache line in the cache set does not include a parameter indicating that the cache line has been prefetched but not requested by the processor, casts out the selected cache line, replaces the cast out cache line with a most recently used data and resets the set of indicators to reflect a new state for the cache set.

13. The method of claim 10, wherein the cache controller moves cache lines in the prefetch buffer to the cache set into empty locations if available and sets a parameter to indicate that the cache line has been prefetched but not requested by the processor and a parameter to indicated that the cache line is valid.

14. The method of claim 10, wherein the cache controller moves cache lines in the prefetch buffer to the cache set into locations having the parameter set to indicate that the cache line in the cache set has been prefetched but not requested by the processor.

15. The method of claim 10, wherein the cache controller discards the cache line in the prefetch buffer when there are no empty locations in the cache set and no locations have the parameter set to indicate that the cache line in the cache set has been prefetched but not requested by the processor.

16. The method of claim 10, wherein the cache controller sets a timestamp to indicate a precise time of accession.

17. The method of claim 10, wherein the cache controller sets the rank flag used for ranking cache lines for being cast out by setting an LRU indicator for use in ranking cache lines according when last used.

18. The method of claim 17, wherein the cache controller changes the LRU flags to most recently used when data in the cache set is accessed before being invalidated or cast out.

19. An information caching system comprising:
   means for requesting data matching an address tag;
   means for storing data;
   means for providing data caching;
   means for controlling the means for providing data caching;
   wherein the means for providing data caching further comprises;
      means for storing data for processing by the means for requesting data, wherein the means for storing data for processing by the means for requesting data includes means for indicating whether the cache line has been prefetched but not requested by the means for requesting data, means for indicating whether the cache line is valid and means for ranking cache lines for being cast out; and
      means for storing data that is prefetched, the means for storing data that is prefetched being associated with the means for storing data for processing by the means for requesting data, wherein the means for storing data that is prefetched includes means for indicating a cache line in the prefetch buffer has been fetched by the means for processing directly thereby bypassing the means for storing data for processing by the means for requesting data, wherein means for controlling the means for providing data caching further comprises means for delivering data having an address tag matching the data request to the means for requesting data and for determining which cache line in the means for storing data for processing to cast out and/or invalidate based upon an analysis of the means for indicating whether the cacheline has been prefetched but not requested by the means for requesting data, means for indicating whether the cache line is valid and means for ranking cache lines for being cast out.

20. An article of manufacture comprising a program storage medium readable by a computer, the medium tangibly embodying one or more programs of instructions executable by the computer to perform an instruction caching method, the method comprising:

storing data for processing by a processor in a cache set for storing, setting a set of indicators for the cache set, the set of indicators including a parameter indicating whether the cache line has been prefetched but not requested by the processor, a parameter indicating whether the cache line is valid and a rank flag used for ranking cache lines for being cast out; and storing data that is prefetched in a prefetch buffer, the prefetch buffer being associated with the cache set, wherein the prefetch buffer includes a fetch tag for indicating a cache line in the prefetch buffer has been fetched by the processor directly thereby bypassing the cache set, delivering to the processor data having an address tag matching a data request from the processor; and determining which cache line in the cache set to cast out and/or invalidate based upon an analysis of the set of indicators of the cache set.

* * * * *

UNITED STATES PATENT AND TRADEMARK OFFICE
CERTIFICATE OF CORRECTION

| | | |
|---|---|---|
| PATENT NO. | : 7,073,030 B2 | Page 1 of 1 |
| APPLICATION NO. | : 10/153966 | |
| DATED | : July 4, 2006 | |
| INVENTOR(S) | : Michael J. Azevedo et al. | |

It is certified that error appears in the above-identified patent and that said Letters Patent is hereby corrected as shown below:

In Title Page (60) Cross-Reference to Related Application:

Col. 1, Line 8: "following" should read --following co-pending--

In the claims:

Col 14, line 3: "The method" should read --The apparatus--
Col 14, line 10: "The method" should read --The apparatus--
Col 14, line 18: "The method" should read --The apparatus--
Col 14, line 24: "The method" should read --The apparatus--
Col 14, line 29: "The method" should read --The apparatus--
Col 14, line 34: "The method" should read --The apparatus--
Col 14, line 36: "The method" should read --The apparatus--
Col 14, line 40: "The method" should read --The apparatus--

Signed and Sealed this

Fifth Day of December, 2006

JON W. DUDAS
*Director of the United States Patent and Trademark Office*